(12) United States Patent  
Yajima et al.

(10) Patent No.: US 8,831,852 B2  
(45) Date of Patent: Sep. 9, 2014

(54) INTEGRATED CONTROLLER FOR VEHICLE

(75) Inventors: Masayuki Yajima, Tokyo (JP); Tasuku Maruyama, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 334 days.

(21) Appl. No.: 13/137,929

(22) Filed: Sep. 21, 2011

(65) Prior Publication Data

US 2012/0078483 A1    Mar. 29, 2012

(30) Foreign Application Priority Data

Sep. 27, 2010    (JP) ................... 2010-215536

(51) Int. Cl.  
*B60T 8/17*    (2006.01)

(52) U.S. Cl.  
USPC ............... 701/73; 701/71; 701/80; 303/121; 303/113.2; 303/149; 303/150

(58) Field of Classification Search  
USPC ............... 701/73, 80, 71; 303/121, 149, 150, 303/113.2  
See application file for complete search history.

(56) References Cited

U.S. PATENT DOCUMENTS

| | | | | |
|---|---|---|---|---|
| 6,044,319 | A * | 3/2000 | Rosendahl et al. | 701/71 |
| 6,318,820 | B1 * | 11/2001 | Usukura | 303/149 |
| 6,567,749 | B2 * | 5/2003 | Matsuura | 701/301 |
| 6,675,096 | B2 * | 1/2004 | Matsuura | 701/301 |
| 7,248,958 | B2 * | 7/2007 | Watanabe et al. | 701/70 |
| 7,434,896 | B2 * | 10/2008 | Sauter | 303/149 |
| 7,448,700 | B2 * | 11/2008 | Terasaka | 303/164 |
| 7,661,772 | B2 * | 2/2010 | Heinemann | 303/146 |

(Continued)

FOREIGN PATENT DOCUMENTS

| JP | 2001-200956 | * 7/2001 |
|---|---|---|
| JP | 2002-104901 | * 4/2002 |

(Continued)

OTHER PUBLICATIONS

Intelligent observer-based road surface condition detection and identification; Lin, P.P. ; MaoshengYe ; Kuo-Ming Lee Systems, Man and Cybernetics, 2008. SMC 2008. IEEE International Conference on; Digital Object Identifier: 10.1109/ICSMC.2008.4811665; Publication Year: 2008 , pp. 2465-2470.*

Vision based road surface detection for automotive systems; Raj, A. ; Krishna, D. ; Hari Priya, R. ; Shantanu, K. ; Niranjani Devi, S. Applied Electronics (AE), 2012 International Conference on; Publication Year: 2012 , pp. 223-228.*

(Continued)

*Primary Examiner* — Cuong H Nguyen  
(74) *Attorney, Agent, or Firm* — McGinn IP Law Group, PLLC

(57) ABSTRACT

In an integrated controller for a vehicle, a main control unit determines whether a road ahead is a split-μ road based on captured images obtained by left and right CCD cameras, and, if so, increases a braking intervention distance correction gain for correcting braking intervention distances set by a collision prevention control unit. The collision prevention control unit performs collision prevention control at a brake timing earlier than usual using the braking intervention distances corrected by the correction gain. Furthermore, when the road ahead is determined to be a split-μ road, the main control unit decreases a target torque correction gain for correcting a target torque set by an engine control unit to prevent the vehicle from becoming unstable as a result of a yaw moment acting on the vehicle generated by a generated driving force due to a difference in friction coefficient μ between left and right road surfaces.

3 Claims, 6 Drawing Sheets

(56) References Cited

U.S. PATENT DOCUMENTS

| | | | |
|---|---|---|---|
| 7,699,137 B2 * | 4/2010 | Yasui et al. | 180/446 |
| 8,342,616 B2 * | 1/2013 | Sawada | 303/113.2 |
| 2002/0198646 A1 * | 12/2002 | Bedner et al. | 701/48 |
| 2003/0028308 A1 * | 2/2003 | Ishikawa et al. | 701/71 |
| 2010/0010710 A1 * | 1/2010 | Kopp et al. | 701/38 |
| 2012/0253602 A1 * | 10/2012 | Fujita et al. | 701/41 |
| 2013/0207453 A1 * | 8/2013 | Knechtges | 303/189 |

FOREIGN PATENT DOCUMENTS

| | | |
|---|---|---|
| JP | 2006-175992 A | 7/2006 |
| JP | 2009-104168 * | 4/2009 |
| WO | PCT/EP07/02796 * | 5/2009 |

OTHER PUBLICATIONS

An application of sliding mode control to vehicle steering in a split-mu maneuver; Hebden, R.G. ; Edwards, C. ; Spurgeon, S.K. American Control Conference, 2003. Proceedings of the 2003; vol. 5; Digital Object Identifier: 10.1109/ACC.2003.1240524 Publication Year: 2003 , pp. 4359-4364 vol. 5.*

Study on stability control during split-mu ABS braking; Shuwen Zhou ; Siqi Zhang; Control and Decision Conference (CCDC), 2011 Chinese; Digital Object Identifier: 10.1109/CCDC.2011.5968377; Publication Year: 2011 , pp. 1235-1239 IEEE Conference Publications.*

* cited by examiner

US 8,831,852 B2

INTEGRATED CONTROLLER FOR VEHICLE

CROSS-REFERENCE TO RELATED APPLICATIONS

The present application claims priority from Japanese Patent Application No. 2010-215536 filed on Sep. 27, 2010, the entire contents of which are hereby incorporated by reference.

BACKGROUND OF THE INVENTION

1. Field of the Invention

The present invention relates to an integrated controller for a vehicle that appropriately controls a vehicle when a split-μ road is detected. A split-μ road is a road that has different values of friction coefficient on the surfaces traveled by left and right wheels.

2. Description of Related Art

In recent years, various technologies for detecting a condition of a road surface on which a vehicle travels and reflecting the detection result in vehicle control have been proposed and used practically. For example, Japanese Patent Application Laid-Open (JP-A) No. 2006-175992 discloses a technology for a vehicle stabilization controller that detects a split-μ road based on a slip ratio and, upon braking when the split-μ road is detected, changes a ratio of a contribution of a steering control unit to that of a braking control unit to be larger as a vehicle speed is lower.

However, the technology disclosed for the vehicle stabilization controller described above detects a split-μ road is based on the slip ratio, and thus performs control in response to an event that has already affected the vehicle. Therefore, the technology cannot perform the control at an appropriate timing for stabilizing the vehicle. Moreover, a vehicle may become unstable on a split-μ road at a time other than braking.

SUMMARY OF THE INVENTION

The present invention is accomplished in view of the above-mentioned circumstances, and aims to provide an integrated controller for a vehicle that can quickly detects a split-μ road and control the vehicle at an appropriate timing.

The present invention provides an integrated controller for a vehicle, including: a front environment recognizing unit configured to recognize a front environment of a subject vehicle based on an image captured by a camera; a split-μ detecting unit configured to detect a split-μ road having different friction coefficients on the surfaces traveled by left and right wheels based on the front environment of the subject vehicle; and an acceleration/deceleration characteristic changing unit configured to change an acceleration/deceleration characteristic of the vehicle when the split-μ road is detected.

DETAILED DESCRIPTION OF THE PREFERRED EMBODIMENTS

Hereinafter, an embodiment of the present invention will be described with reference to the drawings.

Figure 1:
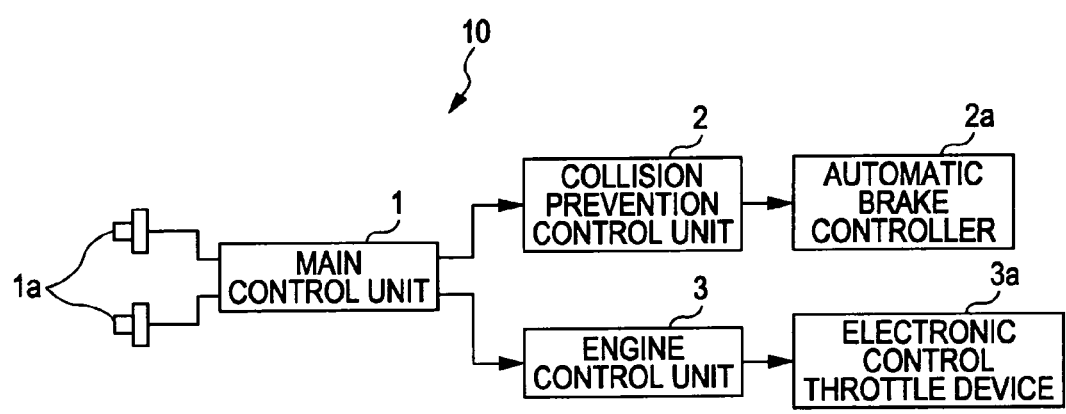
FIG. 1 is an explanatory diagram showing a configuration of an integrated controller for a vehicle according to an embodiment of the present invention.

In FIG. 1, an integrated controller 10 for a vehicle that is mounted on a vehicle mainly includes a main control unit 1, which is connected to a stereo camera 1a, a collision prevention control unit 2 and an engine control unit 3.

The stereo camera 1a includes a left and right pair of CCD cameras using solid state imaging devices such as charge-coupled devices (CCDs), for example. The left and right CCD cameras are attached on front portions of a ceiling of a passenger compartment with a predetermined distance therebetween, and capture images of an external object in stereo from different points of view.

The main control unit 1 divides the image data obtained by the stereo camera 1a into a left region and a right region, and determines whether each of the left region and the right region is a snowy road, an unpaved (dirt) road, a wet paved road, or a dry paved road.

Detection of a snowy road is performed in a manner described in detail in JP-A No. 2001-43352 by the present assignee, for example. Specifically, a condition is detected where it can be assumed that the entire road surface is covered with snow based on image data in a monitored region set at a predetermined region in each of captured images obtained by the left and right CCD cameras of the stereo camera 1a. More specifically, the number of luminance edges in the horizontal direction of the monitored region and the magnitude of total luminance of the monitored region are calculated. If the number of luminance edges is smaller than a determination value and the magnitude of total luminance is larger than a determination value, it can be assumed that the entire road surface is covered with snow, and the subject region is determined to be a snowy road.

Detection of a dirt road, a wet paved road and a dry paved road at the main control unit 1 is performed in a manner described in detail in JP-A No. 2001-43495 by the present assignee, for example. Specifically, the state of luminance change (the number of luminance edges) in the horizontal direction of an image data monitored region set in image data is obtained, and a coordinate value in the height direction of each data piece in a distance data monitored region set in distance data are obtained. Then, firstly, data pieces with a coordinate value in the height direction of −0.4 m or larger and 0.3 m or smaller are detected as dry data such as a lane line, ruts on a road surface and gravel, and data pieces with a coordinate value in the height direction of smaller than −0.4 m are detected as wet data (wet paved road). Next, the dry data are subjected to case analysis, and the subject region is determined to be a dry paved road in the case where the number of luminance edges in the image data monitored region is large and the number of dry data is smaller than a set value. The subject region is detected as a dirt road such as a gravel road in the case where the number of luminance edges in the image data monitored region is small and the number of dry data is large The subject region is detected as a dry paved road such as a paved road without a lane line in the case where the number of dry data is small. Note that the method for detecting road conditions such as a snowy road, a dirt road, a wet paved road and a dry paved road is not limited to the above-described one.

Then, the road ahead is determined to be a split-μ road in the case where the results of determination of the road surfaces for the left and right pictures of the road ahead are different from each other. The determination of a road is not limited to this method. Alternatively, for example, a road ahead may be determined to be a split-μ road in the case where the difference in average luminance between the left and right pictures is a predetermined threshold or more.

Then, when the road ahead is determined to be a split-μ road, the main control unit 1 increases a braking intervention distance correction gain $G_{BR}$ for correcting a braking intervention distance, which is set by the collision prevention control unit 2 and will be described below, so as to change the braking characteristics of a vehicle in the collision prevention control unit 2 for preventing a collision with an obstacle ahead, and outputs the increased brake braking intervention correction gain $G_{BR}$ to the collision prevention control unit 2. In addition, when the road ahead is determined to be a split-μ road, the main control unit 1 decreases a target torque correction gain $G_T$ for correcting a target torque Tt, which is set by the engine control unit 3 and will be described below, and outputs the decreased target torque correction gain $G_T$ to the engine control unit 3.

The collision prevention control unit 2 recognizes forward information such as three-dimensional object data and lane line data ahead of a subject vehicle 1 based on information such as image information from the stereo camera 1a and a subject vehicle speed V, estimates the road on which the subject vehicle is traveling based on the recognized information and the like, and further examines whether or not any three-dimensional object such as an obstacle or a vehicle in front is present on the road on which the subject vehicle is traveling. If a three-dimensional object is present, the collision prevention control unit 2 recognizes a nearest object as a control object for braking control.

Figure 6:
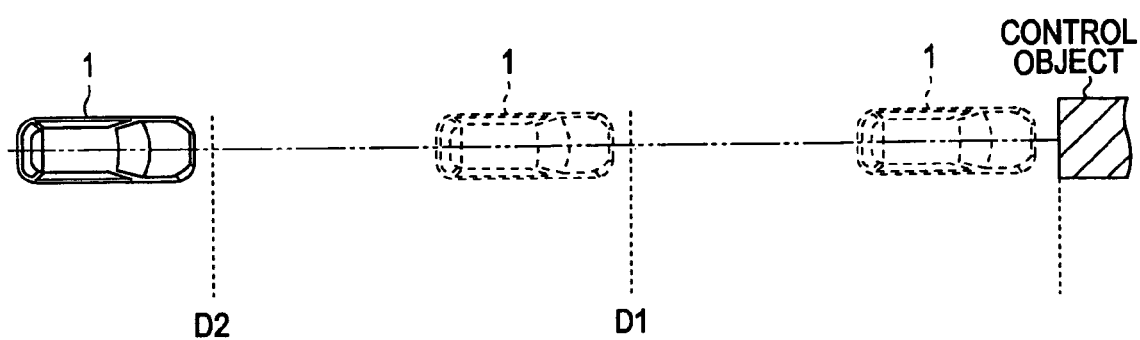
FIG. 6 is an explanatory diagram showing braking intervention distances set between a subject vehicle and a control object in collision prevention control according to the embodiment of the present invention.

Then, when a control object is recognized, the collision prevention control unit 2 performs control for preventing a collision between the subject vehicle and the control object by a method disclosed in JP-A No. 2009-262701, for example. Specifically, in the collision prevention control, first and second braking intervention distances D1 and D2 with respect to the control object are set as the braking intervention distance, for example (see FIG. 6).

Figure 5:
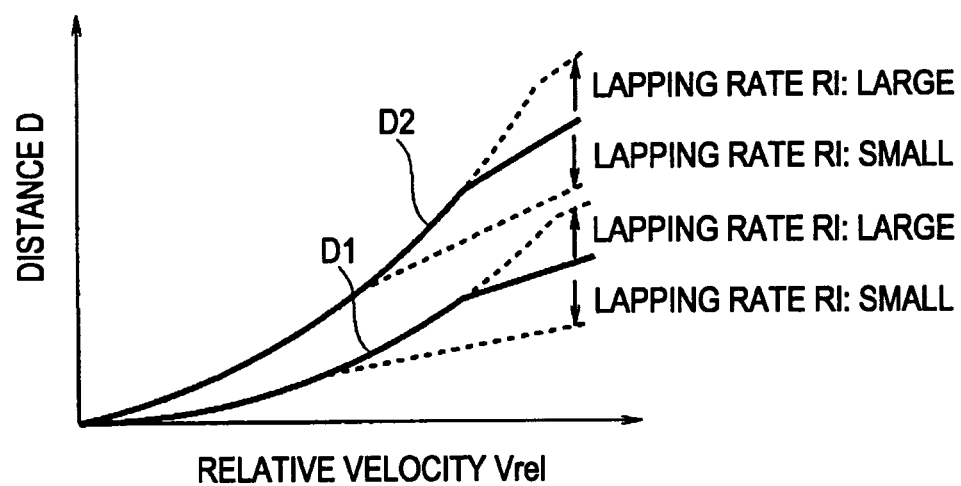
FIG. 5 is a graph showing a relationship of a relative speed and a lapping rate between a subject vehicle and a control object and a braking intervention distance in collision prevention control according to the embodiment of the present invention.

The first braking intervention distance D1 is a limit distance (collision avoidance limit distance) at which it is difficult to avoid collision with the control object by either braking or steering, and is preset based on an experiment, simulation or the like. The collision avoidance limit distance changes with a relative speed Vrel between the subject vehicle and the control object and, furthermore, changes with the relative speed Vrel and a lapping rate Rl between the subject vehicle and the control subject, for example. A map showing the relationship of the relative speed Vrel and the lapping rate Rl between the subject vehicle and the control object and the first braking intervention distance D1 as shown in FIG. 5, for example, is set and stored in advance in the collision prevention control unit 2. The collision prevention control unit 2 sets the first braking intervention distance D1 by referring to the map.

The second braking intervention distance D2 is set to be longer than the first braking intervention distance D1 by a predetermined amount. Specifically, the second braking intervention distance D2 is preset based on an experiment, simulation or the like and is set longer toward the subject vehicle than the collision avoidance limit distance by a predetermined distance depending on the relative speed Vrel. A map showing the relationship of the relative speed Vrel and the lapping rate Rl between the subject vehicle and the control object and the second braking intervention D2 as shown in FIG. 5, for example, is set and stored in advance in the collision prevention control unit 2. The collision prevention control unit 2 sets the second braking intervention distance D2 by referring to the map.

Then, when a relative distance d is equal to or shorter than the first braking intervention distance D1, the collision prevention control unit 2 performs braking control (hereinafter, also referred to as full-scale braking control) by applying an automatic braking intervention. In the full-scale braking control, the collision prevention control unit 2 sets preset fixed values as a deceleration (target deceleration) to be generated by the braking control and as a permitted change amount (deceleration change amount) o upon generating the target deceleration, and calculates a deceleration instruction value based on these values. Then, the collision prevention control unit 2 outputs the calculated deceleration instruction value to an automatic braking controller 2a to activate (apply) automatic braking.

When the relative distance d is longer than the first braking intervention distance D1 and equal to or shorter than the second braking intervention distance D2, the collision prevention control unit 2 performs braking control (hereinafter, also referred to as enhanced braking control) by applying automatic braking prior to the full-scale braking control. In the enhanced braking control, the collision prevention control unit 2 variably sets a target deceleration and a deceleration change amount and calculates a deceleration instruction value based thereon, for example. Then, the collision prevention control unit 2 outputs the calculated deceleration indicated value to the automatic brake controller 2a to activate (apply) automatic braking.

In this process, for setting the above-described first and second braking intervention distances D1 and D2 and performing the collision prevention control, the collision prevention control unit 2 reads the braking intervention distance correction gain $G_{BR}$ from the main control unit 1, corrects the first and second braking intervention distances D1 and D2 (specifically, D1=$G_{BR}$·D1 and D2=$G_{BR}$·D2) and performs the aforementioned collision prevention control using the corrected first and second braking intervention distances D1 and D2. When the road ahead is determined to be a split-μ road, as described above, the braking intervention distance correction gain $G_{BR}$ set by the main control unit 1 corrects the first and second braking intervention distances D1 and D2 set by the collision prevention control unit 2 to be longer, thereby changing the braking characteristics of the vehicle for preventing a collision with an obstacle ahead in the collision prevention control unit 2 (so as to advance the braking intervention timing). Thus, the braking intervention distance correction gain $G_{BR}$ is set to a value larger than one when the road ahead is determined to be a split-μ road.

Figure 7:
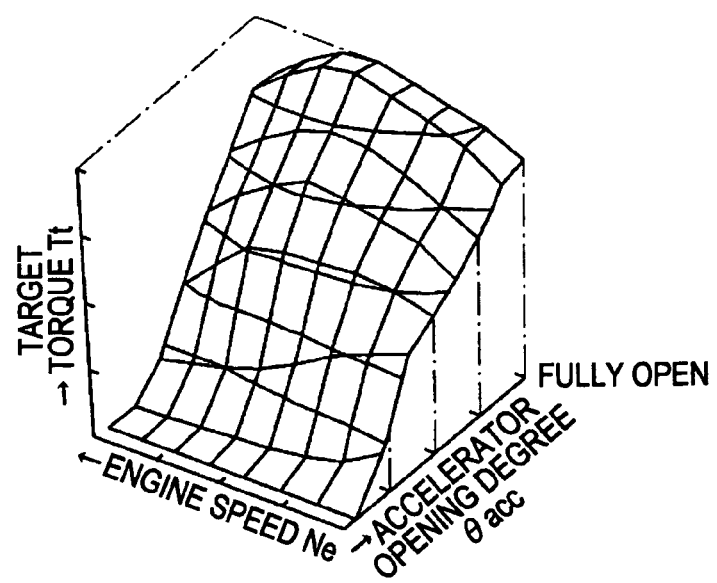
FIG. 7 is a characteristic graph showing an accelerator opening degree, an engine speed and a target torque in engine control according to the embodiment of the present invention.

The engine control unit 3 reads an engine speed Ne and an accelerator opening degree θacc, determines a target torque Tt by referring to a preset engine characteristic map (FIG. 7, for example) with interpolation calculation based on the engine speed Ne and the accelerator opening degree θacc, and determines a final target throttle opening degree θa corresponding to the target torque Tt. Then, the engine control unit 3 reads a throttle opening degree θth, and performs feedback control of a throttle actuator that opens and closes a throttle valve provided in an electronic control throttle device 3a such that the throttle opening degree θth matches the target throttle opening degree θa.

In this process, for determining the target torque Tt as described above, the engine control unit 3 reads the target torque correction gain $G_T$ from the main control unit 1, corrects the target torque Tt (specifically, Tt=$G_T$·Tt), and performs engine control using the corrected target torque Tt. When the road ahead is determined to be a split-μ road, as described above, the target torque correction gain $G_T$ set by the main control unit 1 decreases the target torque Tt set by the engine control unit 3 so as to prevent the vehicle from becoming unstable as a result of a yaw moment acting on the vehicle generated by a generated driving force due to a difference in friction coefficient μ between the left and right road surfaces. Thus, when the road ahead is determined to be a split-μ road, the target torque correction gain $G_T$ is set to a value smaller than one.

Figure 2:
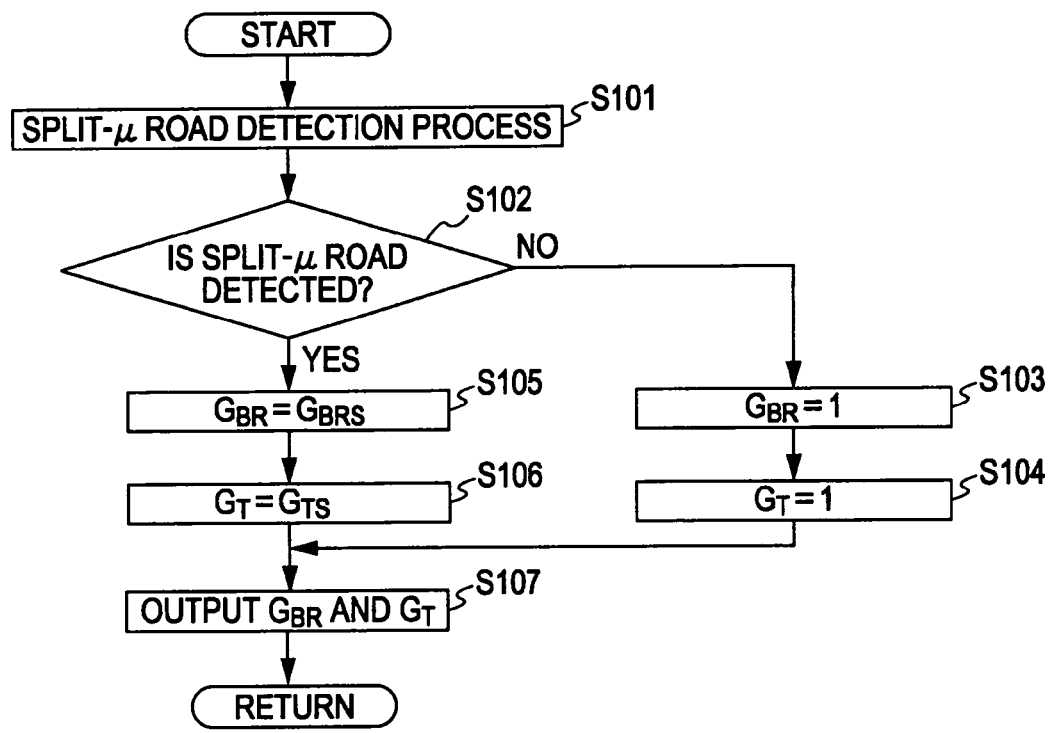
FIG. 2 is a flowchart of an acceleration and braking characteristic changing program according to the embodiment of the present invention.

Next, the integrated vehicle control performed by the main control unit 1 described above will be described referring to the flowchart of FIG. 2.

First, in step (hereinafter, abbreviated to "S") 101, detection of a split-μ road is performed. As described above, a road ahead is determined to be a split-μ road in the case where the results of determination of the road surfaces (determination of a snowy road, an unpaved (dirt) road, a wet paved road and a dry paved road) for the left and right pictures of the road ahead in the image data from the stereo camera 1a are different from each other.

Next, the process proceeds to S102, where it is determined whether or not a split-μ road is detected as a result of the split-μ road detection in S101.

If a split-μ road is not detected as a result of the determination in S102, the process proceeds to S103, where the braking intervention distance correction gain $G_{BR}$ is set to one, then proceeds to S104, where the target torque correction gain $G_T$ is set to one, and then proceeds to S107.

On the other hand, if a split-μ road is detected, the process proceeds to S105, where the braking intervention distance correction gain $G_{BR}$ is set to $G_{BRS}$ that is a value larger than one to correct the first and second braking intervention distances D1 and D2 set by the collision prevention control unit 2 to be longer, thereby changing the braking characteristics of the vehicle for preventing collision with an obstacle ahead in the collision prevention control unit 2 (so as to advance the braking intervention timing).

Next, the process proceeds to S106, where the target torque correction gain $G_T$ is set to $G_{TS}$ that is a value smaller than one to decrease the target torque Tt set by the engine control unit 3 so as to prevent the vehicle from becoming unstable as a result of a yaw moment acting on the vehicle generated by a generated driving force due to a difference in friction coefficient μ between the left and right road surfaces.

Then, the process proceeds to S107, where $G_{BR}$ and $G_T$ set in S103 and S104, or $G_{BR}$ and $G_T$ set in S105 and S106 are output to the collision prevention control unit 2 and the engine control unit 3, respectively, and the program is exited.

Figure 3:
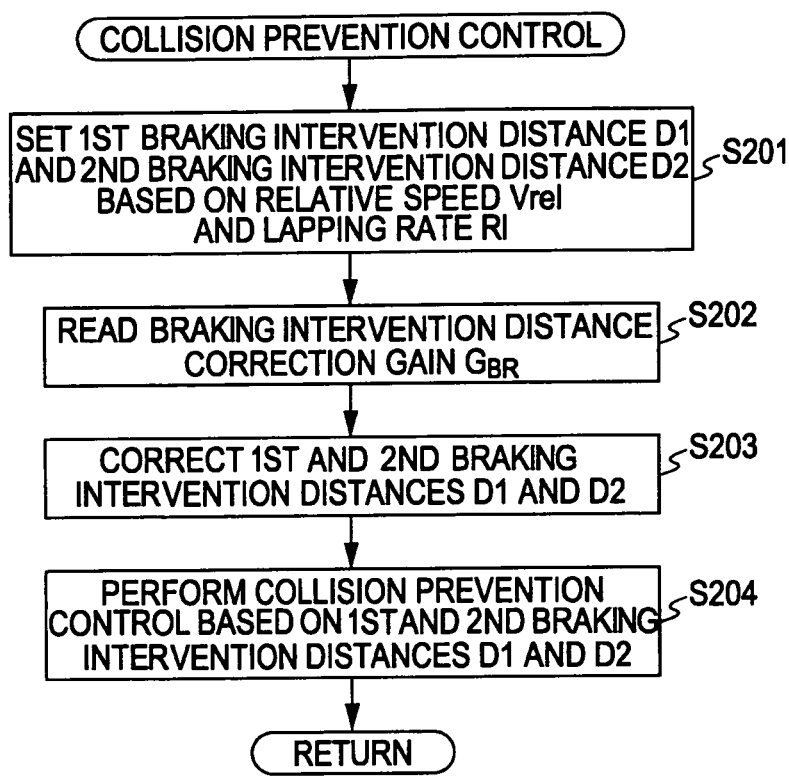
FIG. 3 is a flowchart of a collision prevention control program according to the embodiment of the present invention.

Next, the collision prevention control performed by the collision prevention control unit 2 will be described referring to the flowchart of FIG. 3.

First, in S201, the first braking intervention distance D1 and the second braking intervention distance D2 are set based on the relative speed Vrel and the lapping rate Rl by referring to the preset map (FIG. 5) of the braking intervention distances.

Next, the process proceeds to S202, where the braking intervention distance correction gain $G_{BR}$ is read from the main control unit 1.

Next, the process proceeds to S203, where the first and second braking intervention distances D1 and D2 determined in S201 are corrected to D1=$G_{BR}$·D1 and D2=$G_{BR}$·D2 as described above.

The process then proceeds to S204, where the collision prevention control is performed based on the corrected first and second braking intervention distances D1 and D2 as described above, and the program is exited.

Figure 4:
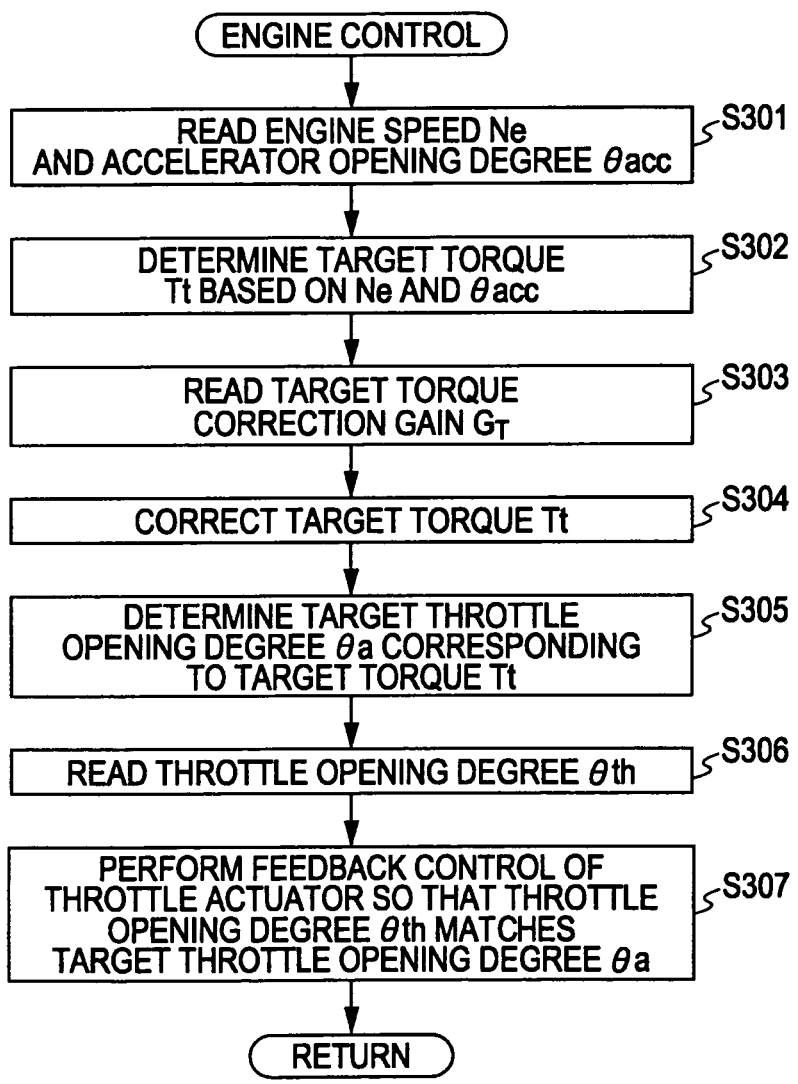
FIG. 4 is a flowchart of an engine control program according to the embodiment of the present invention.

Next, the engine control performed by the engine control unit 3 will be described referring to the flowchart of FIG. 4.

First, in S301, the engine speed Ne and the accelerator opening degree θacc are read.

Next, the process proceeds to S302, where the target torque Tt is determined by referring to the preset engine characteristic map (FIG. 7, for example) with interpolation calculation.

Subsequently, the process proceeds to S303, where the target torque correction gain $G_T$ is read from the main control unit 1.

Subsequently, the process proceeds to S304, where the target torque Tt determined in S302 is corrected to Tt=$G_T$·Tt as described above.

Next, the process proceeds to S305, where the final target throttle opening degree θa corresponding to the target torque Tt is determined.

Then, the process proceeds to S306, where the actual throttle opening degree θth is read, then proceeds to S307, where feedback control of the throttle actuator that opens and closes the throttle valve provided in the electronic control throttle device 3a is performed such that the throttle opening degree θth matches the target throttle opening degree θa, and the program is exited.

As described above, according to the embodiment of the present invention, the main control unit 1 determines whether or not a road ahead is a split-μ road based on images captured by the left and right CCD cameras of the stereo camera 1a. If the road ahead is determined to be a split-μ road, the main control unit 1 increases the braking intervention distance correction gain $G_{BR}$ for correcting the braking intervention distances D1 and D2 set by the collision prevention control unit 2 so as to change the braking characteristics of the vehicle for preventing collision with an obstacle ahead in the collision prevention control unit 2. The collision prevention control unit 2 then performs the collision prevention control at a brake timing earlier than usual using the braking intervention distances D1 and D2 corrected by the braking intervention distance correction gain $G_{BR}$ (to be longer). When the road ahead is determined to be a split-μ road, on the other hand, the target torque correction gain $G_T$ for correcting the target torque Tt set by the engine control unit 3 is decreased so as to prevent the vehicle from becoming unstable as a result of a yaw moment acting on the vehicle generated by a generated driving force due to a difference in friction coefficient μ between the left and right road surfaces. Therefore, it is possible to quickly detect a split-μ road by using captured images obtained by the CCD cameras of the stereo camera 1a and control the vehicle at an appropriate timing.

Note that the braking intervention distance correction gain $G_{BR}$ set for the collision prevention control may be set to different values for the first braking intervention distance D1 and the second braking intervention distance D2. Moreover, the braking intervention distance correction gain $G_{BR}$ may be variably set depending on another parameter (such as a speed of the subject vehicle) of a vehicle (to a larger value as the speed is higher, for example).

In addition, the present invention can be accomplished with other known collision prevention control and engine control.

In the present embodiment, a front environment of the subject vehicle 1 is recognized based on image information from the stereo camera 1a in the present embodiment. Alternately, however, the present invention can also be applied to a vehicle driving support apparatus that recognizes the environment based on image information from a monocular camera.

In addition, by applying the embodiment of the present invention to detect that a road ahead is a low-μ road based on image information from the stereo camera 1a, increase the braking intervention distance correction gain $G_{BR}$ and decrease the target torque correction gain $G_T$ as described above for the low-μ road, it is possible to control the vehicle at an appropriate timing also for a low-μ road as in the present application.

What is claimed is:

1. An integrated controller for a vehicle, comprising:
   a front environment recognizing unit configured to recognize a front environment of a subject vehicle based on an image captured by a camera;
   a split-μ detecting unit configured to detect a split-μ road having different friction coefficients on the surfaces traveled by left and right wheels based on the front environment of the subject vehicle; and
   an acceleration/deceleration characteristic changing unit configured to change an acceleration/deceleration characteristic of the vehicle when the split-μ road is detected.

2. The integrated controller for a vehicle according to claim 1, wherein the acceleration/deceleration characteristic changing unit is configured to change an acceleration characteristic of the vehicle, and decreases a target torque set based on an accelerator opening degree when the split-μ road is detected.

3. The integrated controller for a vehicle according to claim 1, wherein the acceleration/deceleration characteristic changing unit is configured to change a braking characteristic of the vehicle for preventing a collision with an obstacle ahead, and corrects a braking timing to be earlier when the split-μ road is detected.

* * * * *